United States Patent
Tanaka et al.

(10) Patent No.: US 9,000,637 B2
(45) Date of Patent: Apr. 7, 2015

(54) ALTERNATOR FOR VEHICLE

(75) Inventors: Kazunori Tanaka, Chiyoda-ku (JP);
Kyoko Higashino, Chiyoda-ku (JP)

(73) Assignee: Mitsubishi Electric Corporation,
Tokyo (JP)

( * ) Notice: Subject to any disclaimer, the term of this patent is extended or adjusted under 35 U.S.C. 154(b) by 195 days.

(21) Appl. No.: 13/503,302

(22) PCT Filed: Nov. 24, 2009

(86) PCT No.: PCT/JP2009/069782
§ 371 (c)(1),
(2), (4) Date: Apr. 20, 2012

(87) PCT Pub. No.: WO2011/064835
PCT Pub. Date: Jun. 3, 2011

(65) Prior Publication Data
US 2012/0206025 A1    Aug. 16, 2012

(51) Int. Cl.
*H02K 19/36* (2006.01)
*H02K 5/04* (2006.01)
*H02K 11/04* (2006.01)

(52) U.S. Cl.
CPC ................ *H02K 5/04* (2013.01); *H02K 11/046* (2013.01)

(58) Field of Classification Search
CPC .............................. H02K 11/046; H02K 5/04
USPC ........................................... 310/68 D, 89, 71
See application file for complete search history.

(56) References Cited

U.S. PATENT DOCUMENTS

| 6,034,452 | A * | 3/2000 | Nakamura et al. | 310/68 D |
| 6,960,857 | B2 | 11/2005 | Oohashi et al. | |
| 2001/0022477 | A1 | 9/2001 | Ishida | |
| 2005/0151435 | A1 * | 7/2005 | Misaki | 310/89 |
| 2007/0102931 | A1 * | 5/2007 | Oohashi | 290/30 R |
| 2007/0290557 | A1 * | 12/2007 | Ito | 310/58 |
| 2008/0061642 | A1 * | 3/2008 | Koike et al. | 310/71 |
| 2008/0061659 | A1 * | 3/2008 | Nakamura et al. | 310/68 D |
| 2008/0290744 | A1 * | 11/2008 | Oohashi | 310/43 |
| 2008/0290763 | A1 * | 11/2008 | Oohashi et al. | 310/68 D |

FOREIGN PATENT DOCUMENTS

| EP | 1 551 092 A2 | 7/2005 |
| JP | 3042149 U | 7/1997 |
| JP | 2002-017067 A | 1/2002 |
| JP | 2008054428 A * | 3/2008 |
| JP | 2008263702 A * | 10/2008 |

* cited by examiner

*Primary Examiner* — Alex W Mok
(74) *Attorney, Agent, or Firm* — Sughrue Mion, PLLC

(57) ABSTRACT

It is configured in such a manner that a convex portion (15a) provided to an inner surface of a cover (15) protecting a rectifier device (13) and a voltage regulator (14) as components forming a vehicle AC alternator is fit in a concave portion (13a) provided to a component opposing the inner surface of the cover in close proximity and that the fitting configuration is provided to a point-symmetric position with respect to an external connection terminal (Tb or 12) of the components protruding from inside to outside of the cover.

8 Claims, 4 Drawing Sheets

ALTERNATOR FOR VEHICLE

CROSS REFERENCE TO RELATED APPLICATION

This application is a National Stage of International Application No. PCT/JP2009/069782 filed Nov. 24, 2009, the contents of all of which are incorporated herein by reference in their entirety.

TECHNICAL FIELD

The present invention relates to an alternator mounted on a vehicle or the like, and more particularly, to an attachment structure of a cover protecting components of an alternator and an alternator main body.

BACKGROUND ART

There is an alternator for vehicle provided with a front bracket and a rear bracket that support a front bearing and a rear bearing rotatably supporting a rotor, which is a rotating body, in a rotatable manner and configured in such a manner that components immovably supported on the rear bracket on an opposite side to the rotor are covered with a cover made of an insulator, such as resin. It is required to form the cover in such a manner that the cover is configured to expose the alternator terminal B (where it is connected to the battery mounted on a vehicle) and also the terminal insertion opening of the connector (where it is connected to the vehicle connector), and thereby making no problems when in use. At the same time, the cover configuration to protect other electrical components from the external environment is required.

For example, Patent Document 1 describes such a cover shaped like bottomed cylindrical and attached to the alternator main body with at three screw fixing portions and one hook-like fixing portion.

RELATED ART DOCUMENT

Patent Document

Patent Document 1: EP1551092A2 (FIG. 2 and FIG. 3)

SUMMARY OF THE INVENTION

Problems that the Invention is to Solve

In the conventional apparatus described above, however, cover is attached by means of screws penetrating through cover holes to screw holes provided at a higher position of a circuit board as a component not adjacent to the cover. Accordingly, the apparatus in the related art has problems that it is necessary to provide an extra extended portion to the circuit board and that a screwing process at several points is complex and improvement in producibility is not promoted. In addition, the cover and the alternator main body are unsettled and undergo displacement before the screws are fastened.

Further, the hook-shaped fixing portion and a protrusion provided to a regulator housing portion or a brush tube-like housing portion are configured as attachment, other than the screw fixing portions. This configuration is relatively longer and larger than the screw fixing portion, and a space has been used only for these settings.

The invention is devised to solve the problems as above and has an object to provide an alternator capable of enhancing productivity by making it easy to attach a cover to an alternator main body without causing positional displacement.

Means for Solving the Problems

An alternator for vehicle of the invention includes a case supporting components, a rotor supported on the case in a rotatable manner, a stator located on an outer periphery of the rotor and supported on both sides by cases, a stator winding provided to the stator, a rectifier device rectifying an AC electromotive force generated in the stator winding to a DC, and a voltage regulator limiting the alternator power to a specified value, in which at least one of the rectifier device and the voltage regulator, which are the components, is supported on the case on an opposite side to the rotor, and its outer periphery is protected by a cover.

A convex portion provided to an inner surface of the cover is fit in a concave portion provided to the components at a region opposing the inner surface of the cover in close proximity. The fitting configuration is provided to at least a point-symmetric position with respect to an external connection terminal of the components protruding from inside to outside of a alternator cover.

Advantage of the Invention

According to the alternator for vehicle of the invention, it becomes possible to obtain an alternator capable of enhancing productivity by making it easy to attach a cover to an alternator main body without causing positional displacement.

The foregoing and other objects, features, aspects, and advantages of the present invention will become more apparent from the following detailed description of the present invention when taken conjunction with the accompanying drawings.

MODE FOR CARRYING OUT THE INVENTION

Figure 1:
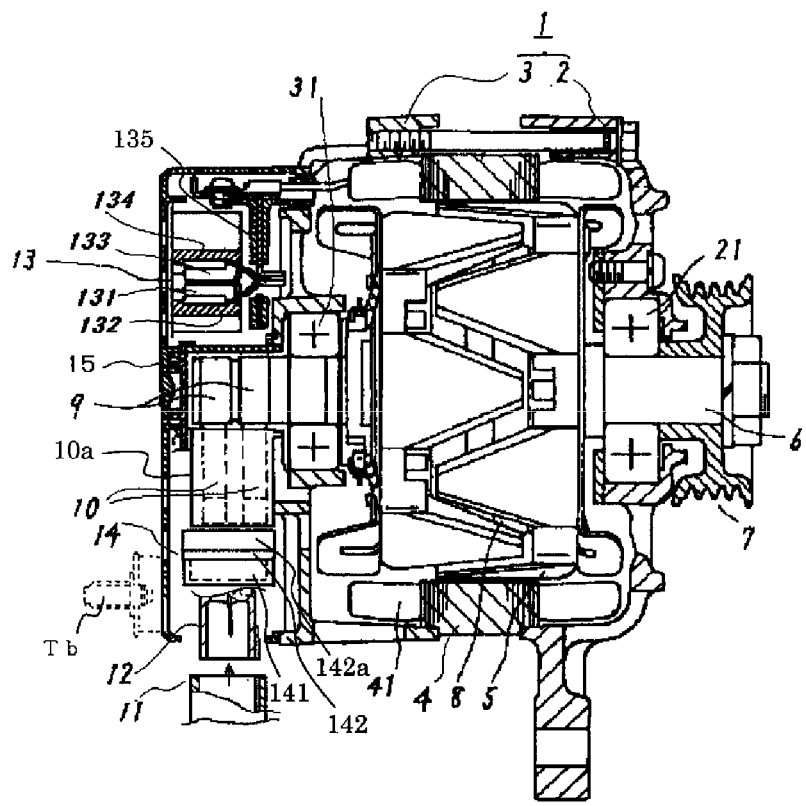
FIG. 1 is a cross section schematically showing an overall configuration of an alternator for vehicle according to a first embodiment of the invention.

Hereinafter, an embodiment of the invention will be described with reference to the drawings. Same reference numerals in the respective drawings denote the same and equivalent portions.

First Embodiment

Figure 2:
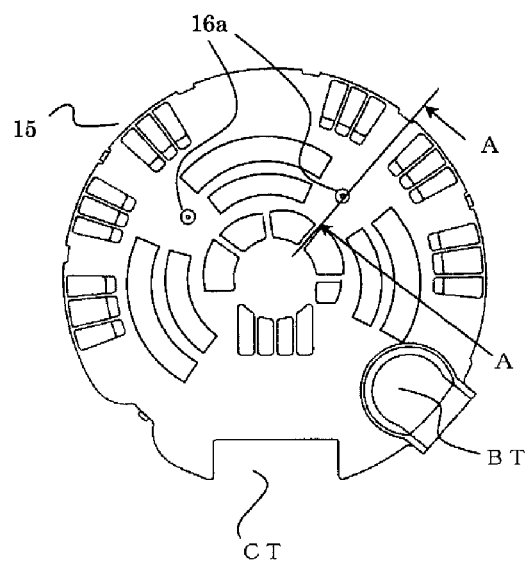
FIG. 2 is a view of a rear cover of FIG. 1 when viewed from a rear side.

FIG. 1 is a cross section of an alternator for vehicle according to a first embodiment. FIG. 2 is a plane view of a rear cover of FIG. 1 when viewed from a rear end.

Firstly, an overall structure of the alternator will be described according to FIG. 1.

Referring to FIG. 1, the alternator includes a front bracket 2 and a rear bracket 3 as a case 1 supporting components, a stator 4 supported on both sides by case 1, and rotor 5 supported also on the case 1 via bearings 21 and 31. The rotor 5 includes a shaft 6 provided with a pulley 7 and is therefore configured to be driven to rotate by a belt (not shown). A field coil 8 is attached inside the rotor 5. A slip ring 9 is provided at one end of the shaft 6 and electrically connected to the field coil 8. A current is therefore supplied to the field coil 8 via the slip ring 9 and a brush 10, from a connector terminal 12, which is a connection portion to an external connector 11. Also, as components supported on the case 1, there are disposed a rectifier device 13 that rectifies an AC generated at a coil 41 in the stator 4 due to a rotating field developed when the rotor 5 is driven to rotate upon supply of a current to the field coil 8 to a DC, and a voltage regulator 14 that limits generated power to a specified value. The outer periphery of components described above are covered with a cover 15 made of an insulator, such as resin, and are therefore protected from an outside.

Figure 5:
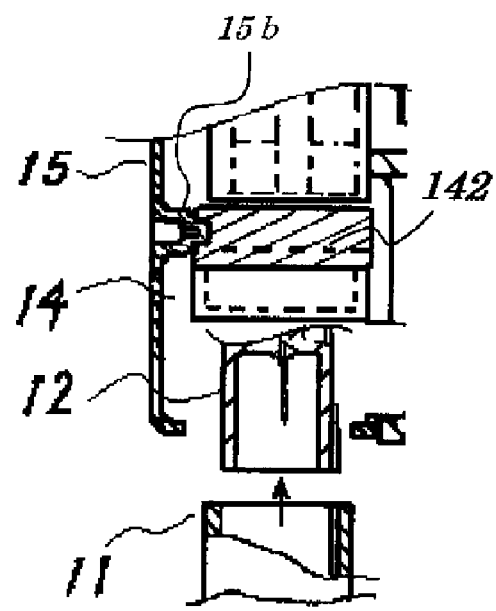
FIG. 5 is a partial cross section of the alternator corresponding to the cross section taken on line A-A of FIG. 2 and showing a second example of the fitting configuration according to the first embodiment of the invention.
Figure 6:
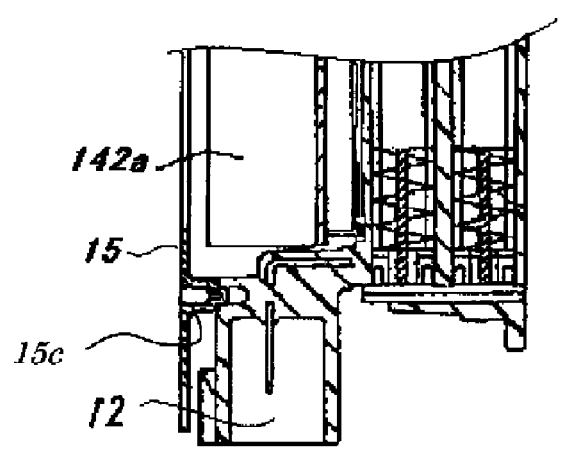
FIG. 6 is a partial cross section of the alternator corresponding to the cross section taken on line A-A of FIG. 2 and showing a third example of the fitting configuration according to the first embodiment of the invention.

In the voltage regulator 14, a voltage regulator circuit portion 141 is provided adjacently to a brush housing portion 10a (see FIG. 7) in which to house the brush 10 and a cooling plate 142 (see FIG. 5) responsible for cooling is provided behind the voltage regulator circuit portion 141 with plural cooling fins 142a (see FIG. 6) protruding from the other surface.

The connecter terminal 12 to which the external connector 11 is to be connected is disposed adjacently to the voltage regulator 14.

The rectifier device 13 includes a positive-electrode cooling member 132 supporting plural (for example, six) positive-electrode rectifier elements 131, a negative-electrode cooling member 134 supporting plural (for example, six) negative-electrode rectifier elements 133, and a terminal board 135 having wiring members electrically connecting the rectifier elements 131 and 133 to the coil 41 in the stator 4. An output terminal bolt (hereinafter, referred to as the B terminal) extracting an output of the alternator to the outside is electrically connected to the positive-electrode cooling member 132. This terminal protrudes to the outside of alternator frame together with the connector terminal tip end described above.

As are shown in FIG. 1 and FIG. 2, the cover 15 is shaped like bottomed cylindrical and attached from an opening side (on the right in FIG. 1) so as to protect the components. Regarding the rectifier device 13 and the voltage regulator 14 as the components protected inside the cover 15, the B terminal Tb of the rectifier device 13 and the connector terminal 12 of the voltage regulator 14 are disposed so that tip ends, which are connection portions to external components, are exposed to the outside of the cover 15. Owing to this configuration, it becomes possible to protect the components without interfering with an electrical connection environment between the alternator and the vehicle.

As has been described, the cover 15 is formed to fit to layout of components, and attached to the alternator at a stage of substantially a final process.

When the cover attaching, it is adjusted so as to expose the connector terminal tip end from the portion CT exposing connector terminal, and the B terminal tip end from portion BT exposing B terminal, as some example shown in FIG. 2. Each tip end is not required to protrude to the outside from the cover 15 necessarily, of course. it is sufficient that there are no failure and there are no hindering configuration around opening when connecting.

An attachment structure of the cover and the alternator main body, which is a major portion of the invention, will now be described using FIG. 3 through FIG. 8.

As has been described, the cover 15 is not simply put on the alternator to which the components are attached. The cover 15 is attached by taking a layout and exposure of the components into consideration. Accordingly, positional displacement tends to occur.

Figure 3:
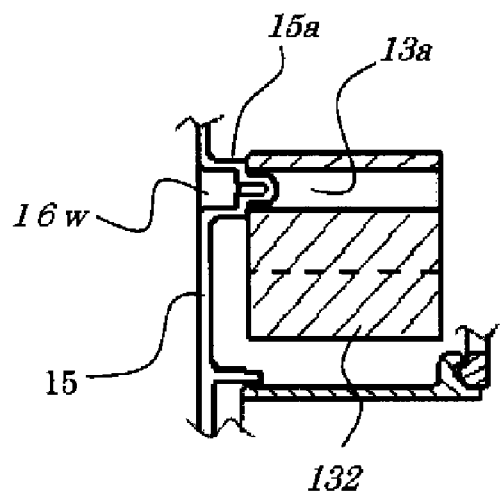
FIG. 3 is a partial cross section of the alternator corresponding to a cross section taken on line A-A of FIG. 2 and showing a first example of a fitting configuration according to the first embodiment of the invention.

According to the invention of the first embodiment, it is configured in such a manner that, as is shown in FIG. 3, a convex portion 15a provided to an inner surface of the cover 15 is fit in a concave portion 13a provided to the cooling member 132 of the rectifier device 13 on the opposing surface in close proximity to the inner surface of the cover 15 at this stage. Because a fit end is the opposing surface in close proximity to the cover 15, displacement and adjustment during a positioning work of the cover 15 can be a minimum. Immediately after or simultaneously with the fitting, several points on a cover outermost peripheral portion are fit immovably in the outer peripheral portion of the rear bracket 3 by an unillustrated known method.

Hence, according to the first embodiment of the invention, after both the cover 15 and the cooling member 132 are positioned, the cover 15 is fixed on the outer peripheral portion of the rear bracket 3. It thus becomes possible to secure vibration resistance when mounted on a vehicle. Also, the concave portion 13a formed in the cooling member 132 is provided to the opposing surface in close proximity to the inner surface of the cover 15. Hence, there is no need to specially provide an extended portion, and space efficiency is not deteriorated.

Also, it is possible to allow the concave portion 13a to penetrate from one end to the other end as is shown in FIG. 3. It goes without saying, however, that a quite small concave portion (recess) is provided alternatively. In any case, it becomes unnecessary to provide an extended fixing portion.

Figure 4:
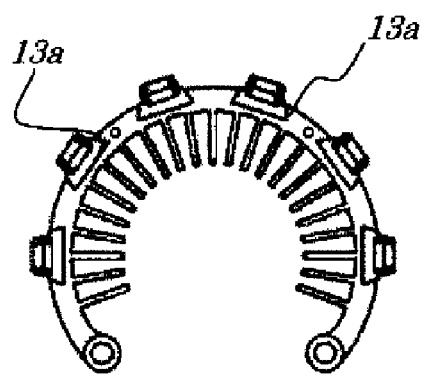
FIG. 4 is a plan view showing an example of a rectifier device cooling member according to the first embodiment of the invention.

For example, for a cooling member of the rectifier device 13 formed in an arc shape as is shown in FIG. 4, it is possible to provide the concave portion 13a in the essential separation space that is needed to some extent and provided between adjacent rectifier elements. Hence, space use efficiency becomes high.

Figure 7:
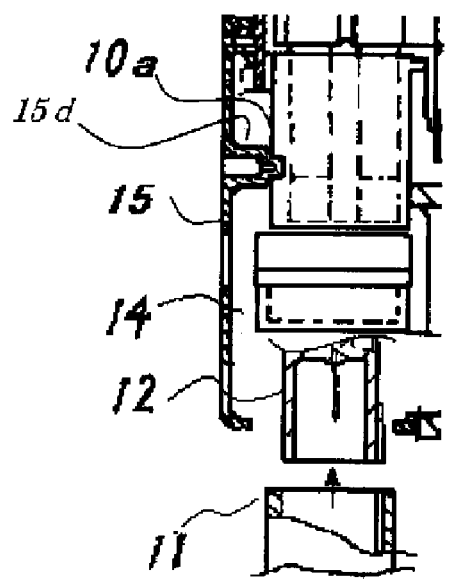
FIG. 7 is a partial cross section of the alternator corresponding to the cross section taken on line A-A of FIG. 2 and showing a fourth example of the fitting configuration according to the first embodiment of the invention.

Besides the cooling member 132 of the rectifier device 13 of FIG. 3, a component to which the fitting configuration is provided can be any component provided with a opposing surface opposing the inner surface of the cover 15 in close proximity, such as the cooling member 142 of the voltage regulator 14 (see FIG. 5), the connecter terminal portion (see FIG. 6), and the brush housing portion 10a (see FIG. 7).

Reliability is enhanced by providing the fitting configuration to more than one point. However, depending on a formation thereof, it is possible to provide the fitting configuration only at one point in a case where the fitting configuration is functionally satisfactory. In a case where the fitting configuration is provided at only on point, in particular, positional displacement can be suppressed in a reliable manner by providing the fitting configuration at a remote and substantially point-symmetric position with respect to the connector terminal exposing portion CT or the B terminal terminal exposing portion BT. It goes without saying that the fitting configuration can be provided to more than one point at point symmetric positions.

As are shown in cross sections of FIG. 3 and FIG. 5 through FIG. 7, a backside of convex portions 15a through 15d provided to the inner surface of the cover 15, that is, the cover outer surface is of a concave shape 16w.

For example, as is shown in FIG. 2, outer surface concave portions (when viewed from an outer surface) 16a provided at two remote points can be used as cover holding portions when the cover 15 is attached to the alternator. The cover 15 can be readily transported on a manufacturing line as it is sandwiched by an unillustrated scissors-like tool inserted in the outer surface concave portions 16a. In this case, the tool itself and a tool operating range can be smaller than in a case where the outermost peripheral portion of the cover 15 is gripped. Hence, a manufacturing space and producibility can be enhanced.

Figure 8:
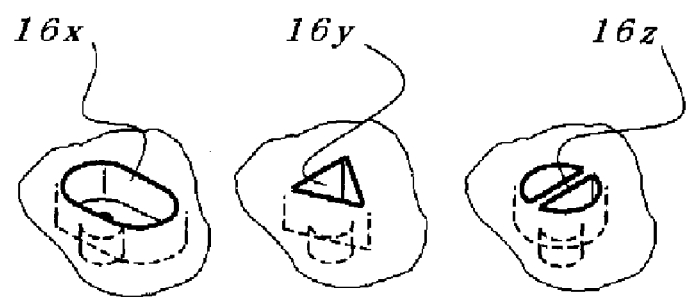
FIG. 8 is a partial perspective view showing other examples of a cover holding configuration according to the first embodiment of the invention.

In the case of the cover holding portions described above, a simply recessed configuration is adopted. However, for example, as is shown in FIG. 8, it is possible to provide a concavo-convex configuration that is further suitable to grip the cover 15. When configured in this manner, even in a case where it is difficult to secure a space to provide more than one cover holding portion, the cover can be held in a satisfactory manner.

In the first embodiment above, it is configured in such a manner that the rear bracket 3 supports both of the voltage regulator 14 and the rectifier device 13. It should be appreciated, however, that the rear bracket 3 may support one of them or, for example, the front bracket 2 may support the both, and that a supporting component is not limited to those described above as long as a relation between the cover 15 and the component is the same.

Further, as to the connecter terminal 12 electrically connected to the voltage regulator 14, there are various configurations corresponding to a vehicle connector and the configuration is not limited to the one shown in the drawings.

Likewise, regarding extending directions (a radial direction or an axial direction with respect to the alternator) of the connecter terminal 12 electrically connected to the voltage regulator 14 and the B terminal Tb of the rectifier device 13, specifications are determined depending on a form of the vehicle connection portion and those shown in the drawings are a mere example.

Also, a location with respect to the connecter terminal 12 and the B terminal Tb and a positional relation with the alternator are determined by taking both the vehicle specification and the configurations and locations of the components forming the alternator into consideration, and the location is not limited to the location shown in the drawings.

As has been described, with the alternator for vehicle according to the first embodiment of the invention, a positioning configuration in which a convex portion provided to an inner surface of a cover is fit in a concave portion provided to a component in close proximity to the cover at a region opposing the inner surface of the cover is provided to an external connection terminal of the component protruding from inside to outside of a alternator cover, that is, at substantially a point-symmetric position with respect to the B terminal or the connecter terminal. It thus becomes possible to obtain an alternator for vehicle capable of enhancing productivity by making it easy to attach the cover including a terminal exposing portion to the alternator main body without causing positional displacement.

INDUSTRIAL APPLICABILITY

The invention is applied to an alternator mounted on a vehicle.

DESCRIPTION OF REFERENCE NUMERALS AND SINGS

2: front bracket
3: rear bracket
10a: brush housing portion
12: connecter terminal
Tb: B terminal
13: rectifier device
13a: concave portion
131 and 133: rectifier element
132 and 134: cooling member
14: voltage regulator
142: cooling plate
15: cover
15a, 15b, 15c, and 15d: convex portion
16w, 16x, 16y, and 16z: outer surface concave portion
BT: B terminal exposing portion
CT: connecter terminal exposing portion

The invention claimed is:

1. An alternator for vehicle comprising a case supporting components, a rotor supported on the case in a rotatable manner, a stator located on an outer periphery of the rotor and supported on both sides by the case, a stator winding provided to the stator, a rectifier device rectifying an AC electromotive force generated in the stator winding to a DC, and a voltage regulator limiting an alternator power to a specified value, in which at least one of the rectifier device and the voltage regulator, which are the components, is supported on the case on an opposite side to the rotor and
   its outer periphery is protected by a cover, characterized in that:
      a convex portion provided to an inner surface of the cover is fit in a concave portion provided to the components at a region opposing the inner surface of the cover in close proximity in a fitting configuration, the convex portion directly contacting the concave portion; and
      the fitting configuration is provided to at least a point-symmetric position with respect to an external connection terminal of the components protruding from inside to outside of the cover.

2. The alternator for vehicle according to claim 1, characterized in that:
   the component provided with the fitting configuration is at least one of the rectifier device and the voltage regulator each of which is attached to the alternator.

3. The alternator for vehicle according to claim 2, characterized in that:
   the fitting configuration provided to the rectifier device is formed of a concave portion provided to a rectifier element cooling member in the opposing surface opposing the inner surface of the cover in close proximity.

4. The alternator for vehicle according to claim 2, characterized in that:
   the fitting configuration provided to the voltage regulator is formed of a concave portion provided to a voltage regulator cooling member in the opposing surface opposing the inner surface of the cover in close proximity.

5. The alternator for vehicle according to claim 2, characterized in that:
the fitting configuration provided to the voltage regulator is formed of a concave portion provided to a voltage regulator connector portion in the opposing surface opposing the inner surface of the cover in close proximity.

6. The alternator for vehicle according to claim 2, characterized in that:
the fitting configuration provided to the voltage regulator is formed of a concave portion provided to a brush housing portion in the opposing surface opposing the inner surface of the cover in close proximity.

7. The alternator for vehicle according to claim 1, characterized in that:
the convex portion provided to the inner surface of the cover has a cover holding portion used to hold the cover from an outer surface side in a backside portion.

8. An alternator for vehicle comprising
a case supporting components,
a rotor supported on the case in a rotatable manner,
a stator located on an outer periphery of the rotor and supported on both sides by the case,
a stator winding provided to the stator,
a rectifier device rectifying an AC electromotive force generated in the stator winding to a DC, and
a voltage regulator limiting an alternator power to a specified value,
wherein at least one of the rectifier device and the voltage regulator, which are the components, is supported on the case on an opposite side to the rotor and its outer periphery is protected by a cover,
wherein a fitting configuration comprises a convex portion provided to an inner surface of the cover that is fit in a concave portion provided to at least one of the components at a region opposing the inner surface of the cover in close proximity, the convex portion directly contacting the concave portion,
wherein the fitting configuration is provided to at least a point-symmetric position with respect to an external connection terminal of the components protruding from inside to outside of the cover.

* * * * *